United States Patent
Calvert et al.

(10) Patent No.: US 9,043,531 B2
(45) Date of Patent: May 26, 2015

(54) HIGH SPEED INPUT/OUTPUT PERFORMANCE IN SOLID STATE DEVICES

(75) Inventors: William Calvert, Cranleigh (GB); Stephen Russell Boorman, Bookham (GB); Simon Mark Haynes, Send (GB)

(73) Assignee: STEC, Inc., Santa Ana, CA (US)

( * ) Notice: Subject to any disclaimer, the term of this patent is extended or adjusted under 35 U.S.C. 154(b) by 355 days.

(21) Appl. No.: 12/492,109

(22) Filed: Jun. 25, 2009

(65) Prior Publication Data

US 2012/0239852 A1     Sep. 20, 2012

Related U.S. Application Data

(60) Provisional application No. 61/075,709, filed on Jun. 25, 2008.

(51) Int. Cl.
*G06F 12/00* (2006.01)
*G06F 11/14* (2006.01)

(52) U.S. Cl.
CPC .................. *G06F 11/1441* (2013.01)

(58) Field of Classification Search
CPC .............. G06F 12/0246; G06F 3/0688; G06F 2212/7209
USPC .......................................................... 711/103
See application file for complete search history.

(56) References Cited

U.S. PATENT DOCUMENTS

| | | | | |
|---|---|---|---|---|
| 5,603,001 | A * | 2/1997 | Sukegawa et al. | 711/103 |
| 6,408,357 | B1 * | 6/2002 | Hanmann et al. | 711/113 |
| 6,676,022 | B1 * | 1/2004 | Guthery et al. | 235/492 |
| 7,003,620 | B2 * | 2/2006 | Avraham et al. | 711/103 |
| 7,111,140 | B2 * | 9/2006 | Estakhri et al. | 711/168 |
| 7,424,587 | B2 * | 9/2008 | Caulkins et al. | 711/165 |
| 7,461,229 | B2 * | 12/2008 | Caulkins et al. | 711/165 |
| 7,464,240 | B2 * | 12/2008 | Caulkins et al. | 711/165 |
| 7,574,554 | B2 * | 8/2009 | Tanaka et al. | 711/103 |
| 7,660,911 | B2 | 2/2010 | McDaniel | |
| 7,765,359 | B2 * | 7/2010 | Kang et al. | 711/103 |
| 7,882,320 | B2 * | 2/2011 | Caulkins | 711/165 |
| 7,930,468 | B2 * | 4/2011 | Caulkins | 711/103 |
| 7,983,051 | B2 * | 7/2011 | Lee et al. | 361/736 |
| 8,037,234 | B2 | 10/2011 | Yu et al. | |
| 8,661,188 | B2 * | 2/2014 | Huang | 711/103 |
| 2007/0165457 | A1 * | 7/2007 | Kim | 365/185.11 |
| 2007/0294467 | A1 * | 12/2007 | Leung | 711/103 |
| 2008/0098192 | A1 | 4/2008 | Im et al. | |
| 2008/0307192 | A1 * | 12/2008 | Sinclair et al. | 711/218 |
| 2009/0157950 | A1 | 6/2009 | Selinger | |
| 2009/0172260 | A1 * | 7/2009 | Olbrich et al. | 711/103 |
| 2009/0271562 | A1 * | 10/2009 | Sinclair | 711/103 |
| 2010/0042901 | A1 * | 2/2010 | Moshayedi et al. | 714/773 |

OTHER PUBLICATIONS

Hsu, W-C., and James E. Smith. "Performance of cached DRAM organizations in vector supercomputers." ACM SIGARCH Computer Architecture News 21.2 (1993): 327-336.*

* cited by examiner

*Primary Examiner* — Tuan Thai
(74) *Attorney, Agent, or Firm* — McDermott Will & Emery LLP

(57) ABSTRACT

A method of transferring data in a flash storage device comprising a random access memory and a plurality of channels of a flash array is provided. The method comprises receiving a plurality of data segments from a host system, storing the plurality of data segments in the random access memory, allocating the plurality of data segments among the plurality of channels of the flash array, and writing the allocated data segments from the random access memory to the respective channels of the flash array.

14 Claims, 9 Drawing Sheets

| LBA | Ch No. | Cache Inidcator | Physical Address/ Cache Block Number |
|---|---|---|---|
| 615 | 620 | 625 | 630 |

FIG. 6

HIGH SPEED INPUT/OUTPUT PERFORMANCE IN SOLID STATE DEVICES

RELATED APPLICATION

The present application claims the benefit of priority under 35. U.S.C. §119 from U.S. Provisional Patent Application Ser. No. 61/075,709, entitled "SOLID STATE DEVICE," filed on Jun. 25, 2008, which is hereby incorporated by reference in its entirety for all purposes.

FIELD OF THE INVENTION

The disclosure generally relates to storage devices and, in particular, relates to data access in a flash storage device.

BACKGROUND OF THE INVENTION

Flash memory is an improved form of Electrically-Erasable Programmable Read-Only Memory (EEPROM). Traditional EEPROM devices are only capable of erasing or writing one memory location at a time. In contrast, flash memory allows multiple memory locations to be erased or written in one programming operation. Flash memory can thus operate at higher effective speeds than traditional EEPROM.

Flash memory enjoys a number of advantages over other storage devices. It generally offers faster read access times and better shock resistance than a hard disk drive (HDD). Unlike dynamic random access memory (DRAM), flash memory is non-volatile, meaning that data stored in a flash storage device is not lost when power to the device is removed. For this reason, a flash memory device is frequently referred to as a flash storage device, to differentiate it from volatile forms of memory. These advantages, and others, may explain the increasing popularity of flash memory for storage applications in devices such as memory cards, USB flash drives, mobile phones, digital cameras, mass storage devices, MP3 players and the like.

Current flash storage devices suffer from a number of limitations. Although flash memory can be read or written at the physical page level, it can only be erased or rewritten at the block level. Beginning with a pre-erased block, data can be written to any physical page within that block. However, once data has been written to a physical page, the contents of that physical page cannot be changed until the entire block containing that physical page is erased. In other words, while flash memory can support random-access read and write operations, it can not support random-access rewrite or erase operations.

Generally, a flash storage device is comprised of large physical blocks that are optimized for large block sequential data transfer. Consequently, there is considerable overhead in the block carry-over and garbage collection which adversely impacts write performance. As the density of a flash storage device increases, the number of blocks is increased, resulting in even more overhead and lower performance for write operations.

Accordingly, there is a need for improved memory controllers and memory management methods to improve the write performance of flash storage devices.

SUMMARY OF THE INVENTION

According to one aspect of the disclosure, a method of transferring data in a flash storage device comprising a random access memory and a plurality of channels of a flash array is provided. The method comprises receiving a plurality of data segments from a host system, storing the plurality of data segments in the random access memory, allocating the plurality of data segments among the plurality of channels of the flash array, and writing the allocated data segments from the random access memory to the respective channels of the flash array.

According to another aspect of the disclosure, a flash storage device is provided. The flash storage device comprises a random access memory, a flash array comprising a plurality of flash memories and a respective plurality of channels, and a controller configured to receive a plurality of data segments from a host system, to store the plurality of data segments in the random access memory, to allocate the plurality of data segments among the plurality of channels of the flash array, and to write the allocated data segments from the random access memory to the respective channels of the flash array.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate aspects of the invention and together with the description serve to explain the principles of the invention. In the drawings:

FIG. 6 illustrates an example of an address table according to an aspect of the disclosure.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
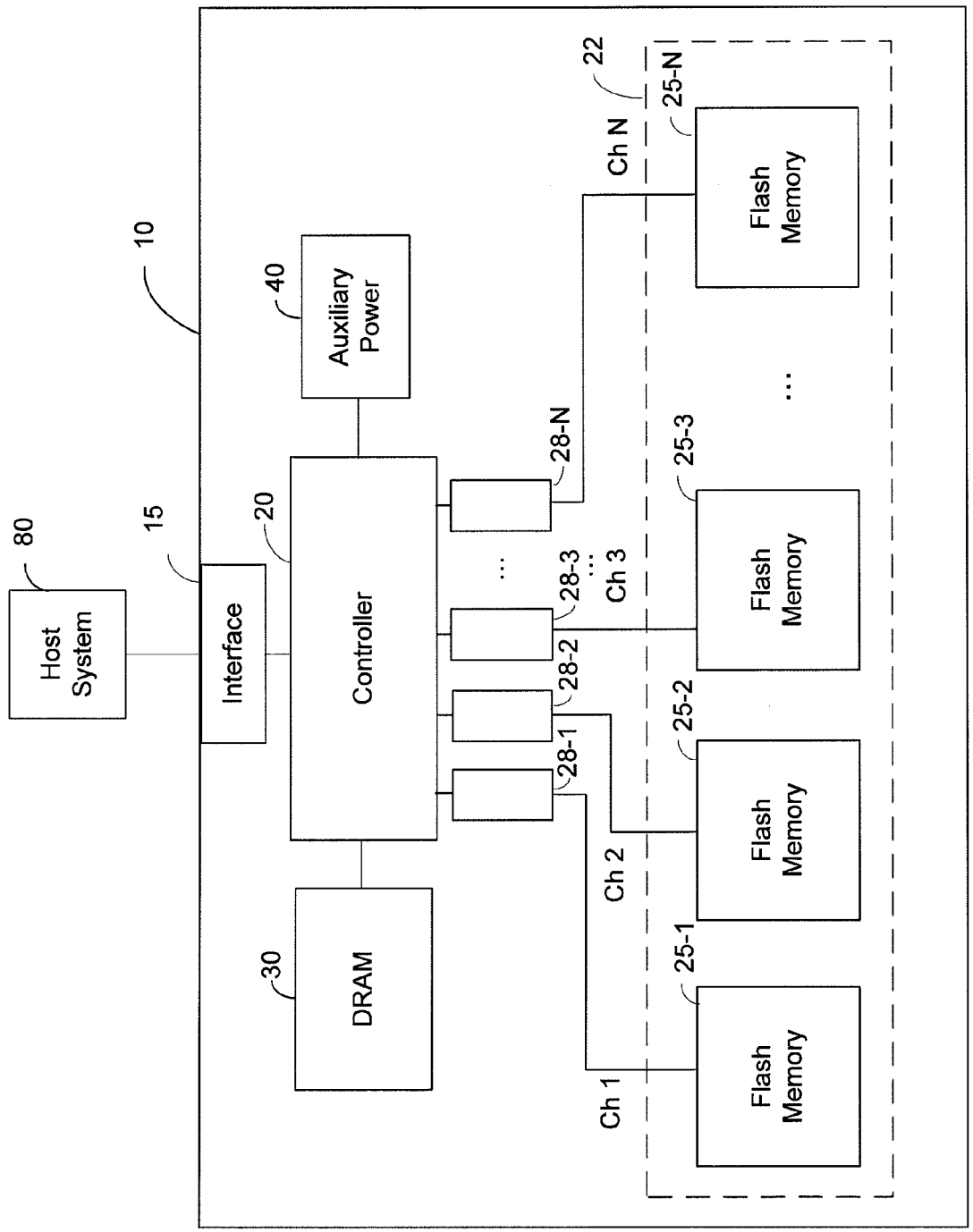
FIG. 1 depicts a block diagram of a flash storage device according to one aspect of the disclosure.

FIG. 1 is a block diagram of a multiple-channel flash storage device 10 according to an aspect. The multiple-channel flash storage device 10 includes an interface 15, a controller 20 and a flash array 22. The interface 15 interfaces the flash storage device 10 to a host system 80, and allows the flash storage device 10 to receive data (e.g., to be written into the flash array 22) from the host system 80 and send data to the host system 80 (e.g., data read from the flash array 22). The controller 20 controls operations of the flash storage device 10 and manages data flow between the host system 80 and the flash array 22, as discussed further below.

The controller 20 may be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The controller 20 may also include firmware (e.g., software code) that is stored in a machine-readable medium and executed by a processor to perform the functions described herein.

The flash array 22 comprises a plurality of flash memories 25-1 to 25-N split among N channels. Each flash memory 25-1 to 25-N may comprise one or more physical flash chips, which may be implemented using NAND flash, NOR flash, or other flash technology. The flash memories 25-1 to 25-N may comprise different numbers of flash chips. For example, within the same flash storage device 10, some of the flash memories 25-1 to 25-N may comprise one flash chip while others may comprise more than one flash chip.

The flash storage device 10 further comprises a plurality of flash memory interfaces 28-1 and 28-N. Each flash memory interface 28-1 to 28-N interfaces the controller 20 to one of the flash memories 25-1 to 25-N via the corresponding channel. Each of the N channels may be implemented using one or more physical I/O buses coupled between one of the flash memory interfaces 28-1 to 28-N and the corresponding flash memory 25-1 to 25-N. Each of the N channels allows the corresponding flash memory interface 28-1 to 28-N to send read, write and/or erase commands to the corresponding flash memory 25-1 to 25-N. As discussed further below, each flash memory interface 28-1 to 28-N may include a register (e.g., First-In-First-Out (FIFO) register) that queues read, write and/or erase commands from the controller 20 for the corresponding flash memory 25-1 to 25-N. Although the term "channel," as used above, referred to the bus coupled between a flash memory interface 28-1 and 28-N and the corresponding flash memory 25-1 to 25-N, the term "channel" may also refer to the corresponding flash memory 25-1 to 25-N that is addressable through the bus.

The flash memories 25-1 to 25-N may be logically divided into data blocks. A data block may also be referred to as a memory block. Each data block may be further divided into data segments. A data segment may also be referred to as a page. For example, each data block may be 128 kilobytes (K bytes) in size, and each data segment may be 4 kilobytes (K bytes) in size. In this example, each data block has 32 4 K byte data segments. The data blocks may have other sizes besides 128 K bytes, including, but not limited, to 256 K bytes or 512 K bytes. For example, a 256 K byte data block may have 64 4 K byte data segments. The data segments may also have other sizes besides 4 K bytes. For example, the data segments may have any size that is a multiple of 1 K bytes or 2 K bytes. A data block may span one or more physical flash chips.

The flash storage device 10 also comprises a Dynamic Random Access Memory (DRAM) 30. Other types of random access memory and/or volatile memory may also be used. The DRAM 30 may be used to buffer data to be written into the flash array 22 and buffer data read from the flash array 22. The data to be written may be incoming data from a host system 80 and/or data being rewritten from one portion of the flash array 22 to another portion of the flash array 22. The flash storage device 10 also comprises an auxiliary power device 40 for providing backup power, which is described in further detail below.

Figure 2:
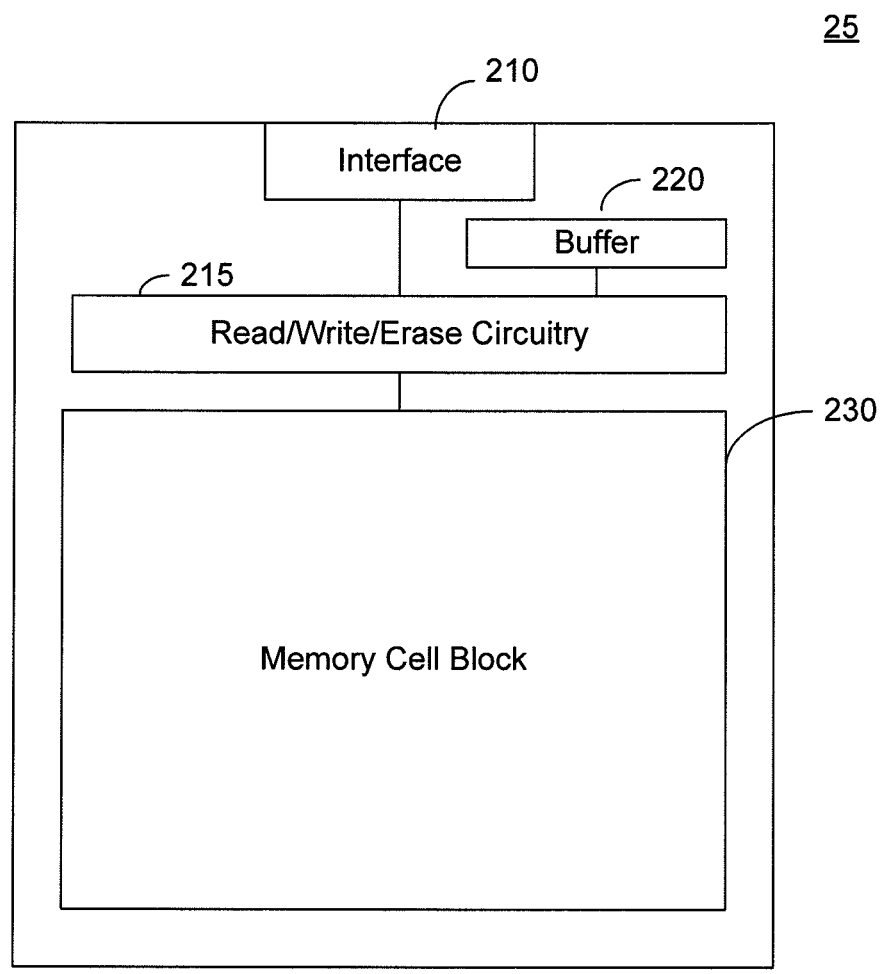
FIG. 2 depicts a block diagram of a flash memory according to an aspect of the disclosure.

FIG. 2 is a block diagram of an exemplary flash memory 25 according to an aspect. The flash memory 25 includes an interface 210, read/write/erase circuitry 215, a buffer 220, and a memory cell block 230. The interface 210 interfaces the flash memory 25 to the corresponding flash memory interface 28-1 to 28-N via the corresponding channel, and allows the read/write/erase circuitry 215 to receive read, write and/or erase commands from the corresponding flash memory interface 28-1 to 28-N and to send data read from the memory cell block 230 to the corresponding flash memory interface 28-1 to 28-N in response to a read command. The memory cell block 230 comprises an array of flash memory cells, where each cell may store one bit or multiple bits. The flash memory cells may be implemented using NAND flash, NOR flash, or other flash technology.

The read/write/erase circuitry 215 may write data to the memory cell block 230 based on a write command from the corresponding flash memory interface 28-1 to 28-N. The write command may include an address of where the corresponding data is stored in the data cache and a physical address of where the data is to be written in the flash memory 25. The read/write/erase circuitry 215 may also read data from the memory cell block 230 based on a read command from the corresponding flash memory interface 28-1 to 28-N and send the read data to the corresponding flash memory interface 28-1 to 28-N. The corresponding flash memory interface 28-1 to 28-N may then transfer the read data to the data cache. The read command may include a physical address of where the data is to be read from the flash memory 25. The read/write/erase circuitry 215 may also erase one or more data blocks in the memory cell block 230 based on an erase command from the corresponding flash memory interface 28-1 to 28-N. The erase command may include a physical address of the data block to be erased.

The buffer 220 may be used to temporarily store data to be written to the memory cell block 230. For example, when the corresponding flash memory interface 28-1 to 28-N sends a write command to the flash memory 25, the flash memory interface 28-1 to 28-N may also transfer the data (e.g., data segment) for the write command from the data cache to the flash memory 25. Upon receiving the data for the write command, the read/write/erase circuitry 215 may temporarily store the received data in the buffer 220 and write the data from the buffer 220 to the memory cell block 230 at the physical address specified in the write command. When all of the data in the buffer 220 for the write command has been written to the memory cell block 20, the read/write/erase circuitry 215 may send an indication to the corresponding flash memory interface 28-1 to 28-N that the flash memory 25 has successfully completed the write operation for the write command and is ready for another command.

The buffer 220 may also be used to temporarily store data read from the memory cell block 230. For example, when the read/write/erase circuitry 215 reads data from the memory cell block 230 in response to a read command, the read/write/erase circuitry may temporarily store the read data in the buffer 220. When all of the data requested by the read command has been read from the memory cell block 230 and stored in the buffer 220, the read/write/erase circuitry 215 may send all of the data from the buffer 220 to the corresponding flash memory interface 28-1 to 28-N. The flash memory interface 28-1 to 28-N may then transfer the read data to the data cache.

In one aspect, the host system 80 may send data to and receive data from the flash storage device 10 in data sectors. For example, each data sector may be 512 bytes in size with eight data sectors per 4 K byte data segment. The host system 80 may use different size data sectors.

In one aspect, the host system 80 may address data sectors stored in the flash storage device 10 using host Logical Block Addresses (LBAs). The host LBAs allow the host system 80 to address data sectors to be written to or read from the flash storage device 10 without having to know the physical locations of the data sectors in the flash storage device 10. The host LBAs may be implemented using an addressing scheme where data sectors are located by an index, with the host LBA of a first data sector being host LBA 0, the host LBA of a second data sector being host LBA 1, and so on.

In one aspect, the flash storage device 10 may store eight data sectors (e.g., 512 bytes) from the host system 80 into one data segment (e.g., 4 K bytes). The number of data sectors per data segment may be different depending on the size of a data sector and the size of a data segment. In this aspect, the controller 20 may address data segments in the flash storage device 10 using flash LBAs, in which 8 host LBAs corresponds to one flash LBA identifying a data segment. In this disclosure, the term "flash LBA" refers to an LBA for logically addressing a data segment and the term "host LBA" refers to an LBA for logically addressing a data sector.

For the example in which there are eight data sectors per data segment, the host LBAs and flash LBAs may begin at zero so that host LBAs 0-7 correspond to flash LBA 0, host LBAs 8-15 correspond to flash LBA 1, and so on. As a result, a sequence of eight host LBAs identifying eight data sectors corresponds to a flash LBA identifying a data segment that includes the eight data sectors. In this example, the controller 20 may determine the flash LBA corresponding to a host LBA by dividing the host LBA by the number of data sectors in a data segment (e.g., 8) and using the integer quotient for the flash LBA. For example, the data sector identified by host LBA 14 is stored in the data segment identified by flash LBA 1.

Figure 3A:
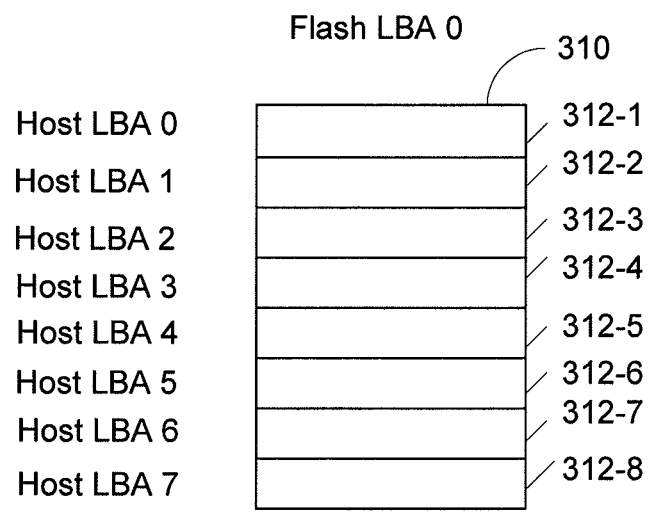
FIG. 3A illustrates an example of a data segment comprising a plurality of data sectors according to an aspect of the disclosure.

FIG. 3A illustrates an example of a data segment 310 comprising eight data sectors 312-1 to 312-8. Each data sector 312-1 to 312-8 may be stored at a know position within the data segment 310 relative to the other data sectors 312-1 to 312-8. When the controller 20 receives a host LBA for a data sector, the controller 20 may determine the flash LBA for the corresponding data segment, as discussed above. The controller 20 may also determine the corresponding one of the data segments 312-1 to 312-8 within the data segment 310 based on the relative position of the received host LBA within the sequence of host LBAs corresponding to the flash LBA. For example, if the host LBA is third within the sequence of host LBAs corresponding to the flash LBA, then the third data segment 312-3 within the data segment identified by the flash LBA corresponds to the host LBA. FIG. 3A shows an example of a data segment 310 identified by flash LBA 0 and the corresponding host LBAs 1-7 for the data sectors 312-1 to 312-8. The data segment 310 may include a sector index indicating which of the data sectors 312-1 to 312-8 in the data segment 310 are valid. For example, if the host system 80 sends a write command for only host LBAs 0-3, then the data segment for flash LBA 0 would hold four valid data sectors.

In one aspect, the host system 80 may address data sectors to be written to and/or read from the flash storage device 10 using host LBAs. For example, when writing data to the flash storage device 10, the host system 80 may send one or more data sectors with one or more corresponding host LBAs. Later, the host system 80 may randomly read any one of the data sectors from the flash storage device 10 using the corresponding host LBAs in a host read command. The controller 20 of the flash storage device 10 may write and/or read requested data sectors to and/or from the flash array 22 using the corresponding flash LBAs, which may be determined as discussed above.

In an aspect, the flash LBAs in the flash storage device 10 are split evenly among the N channels so that 1/N of the flash LBAs are assigned to the first channel, and so forth. Evenly splitting the flash LBAs among the channels increases the likelihood that, on a read corresponding to more than one flash LBA, not all of the data comes from one channel.

The flash LBAs may be evenly split among the N channels using any one of a number of methods. For example, the controller 20 may use an algorithm to determine which channel to assign each flash LBA. The algorithm may be a MOD function that divides a flash LBA by the number of channels N and outputs the remainder of the division, where the remainder represents the channel assigned to the flash LBA. For example, in a 16 channel device, flash LBA 12101 would be assigned to channel 5 (i.e., 12101 MOD 16=5). This algorithm provides an even distribution of the flash LBAs among channels. The above algorithm provides just one example of evenly splitting the flash LBAs among the channels. Other algorithms may be used to evenly split flash LBAs among the channels. An example in which flash LBAs are evenly split among channels is discussed below.

An address table mapping all flash LBAs to physical addresses in the flash array 22 is kept in the DRAM 30. The controller 20 in the flash storage device 10 stores data segments into physical addresses in the flash array 20 and maps each flash LBA to the physical address where the corresponding data segment is stored in the address table. When the host system 80 sends a host read command to the flash storage device 10 with one or more host LBAs, the controller 20 determines the corresponding LBAs, as discussed above. The controller 20 then maps the corresponding flash LBAs to physical addresses in the flash array 22 using the address table and reads the requested data from the physical addresses in the flash array 22. A flash LBA may be 28-bits in length or have another length depending on the amount of logically addressable memory in the flash array 22. An example of an address table is given below.

When the controller 20 writes a data segment to a physical address in the flash array 22, the controller 20 may store the corresponding flash LBA in the physical address with the data segment, along with other information discussed below. This allows the controller 20 to reconstruct the address table by reading the flash LBAs stored in the physical addresses of the flash array 22 in the event that the address table is lost.

The flash storage device 10 has power back-up to make sure that certain functions are performed in the event of a power loss. One of these functions may be to store the address table in non-volatile memory to preserve the table, e.g., by writing the address table from the DRAM 30 to flash array 22 when the power goes off (either expectedly or unexpectedly). This enables the flash storage device 10 to start up or initialize faster because the address table can be read from flash (which may only take two seconds) instead of having to read all of the data in flash memory to reconstruct the address table. In other words, the address table does not have to be reconstructed since the address table is stored in the flash array 22 by the back-up power.

In one aspect, the auxiliary power device 40 comprises super capacitors that charge when the flash storage device 10 receives power, and provides auxiliary power when the main power goes off by using energy stored in the super capacitors. This allows data (e.g., address table) to be written into flash array 22 when the power goes off unexpectedly. The controller 20 may detect a power failure using a voltage threshold detector that detects when the voltage of a power supply falls below a threshold voltage. Upon detecting a power failure, the controller 20 may save all critical data (e.g., address table) to the flash array 22 using the auxiliary power provided by the auxiliary power device 40. Besides triggering this process upon detection of a power failure, the controller 20 may trigger this process on a sync cache command, flush cache command, power down immediate command, standby command, etc. The commands may come from the host system 80 and/or the controller 20. The auxiliary power device 40 may comprise one or capacitors, one or more batteries, or other forms of energy storage devices.

Data received by the flash storage device 10 is stored in the DRAM 30 and regardless of whether the data is received sequentially or randomly, the data is written from the DRAM 30 to the flash array 22 in a sequential manner on a per channel basis, as discussed further below. This makes data reads from the flash array 22 random. Since flash memory typically has good sequential write performance and random read performance, this arrangement takes advantage of the sequential write performance and random read performance of the flash memories 25-1 to 25-N.

In one aspect, data is buffered in a portion of the DRAM 30 referred to as a data cache. The data cache may occupy all remaining DRAM 30 after everything else has been allocated in the DRAM 30, for example, the address table and the linked lists discussed below. Therefore, the size of the data cache varies depending on the device size and configuration. In one aspect, the flash storage device 10 does not start up unless there is a minimum amount of memory (e.g., at least 16 MB of DRAM) available for the data cache. The data cache may be split up into a plurality (e.g., thousands) of small cache blocks which are each the size of one data segment (e.g., 4K bytes).

All read and write data is transmitted between the host system 80 and the flash array 22 via the data cache in the DRAM 30. When the host system 80 writes data, the data is written into the data cache. When the data cache receives enough data to fill a complete data block, the data is read from the data cache and written to the flash array 22. When the host system 80 reads data, the data is read from the flash array 22, written into the data cache and then read from the data cache and transmitted to the host system 80 over the host interface. A central processing unit (CPU) of the host system 80 does not have to copy the data to/from the data cache or receive the data. The CPU may instruct hardware where to send the data or where to retrieve the data from and the hardware does the rest (e.g., via direct memory access (DMA)).

Figure 3B:
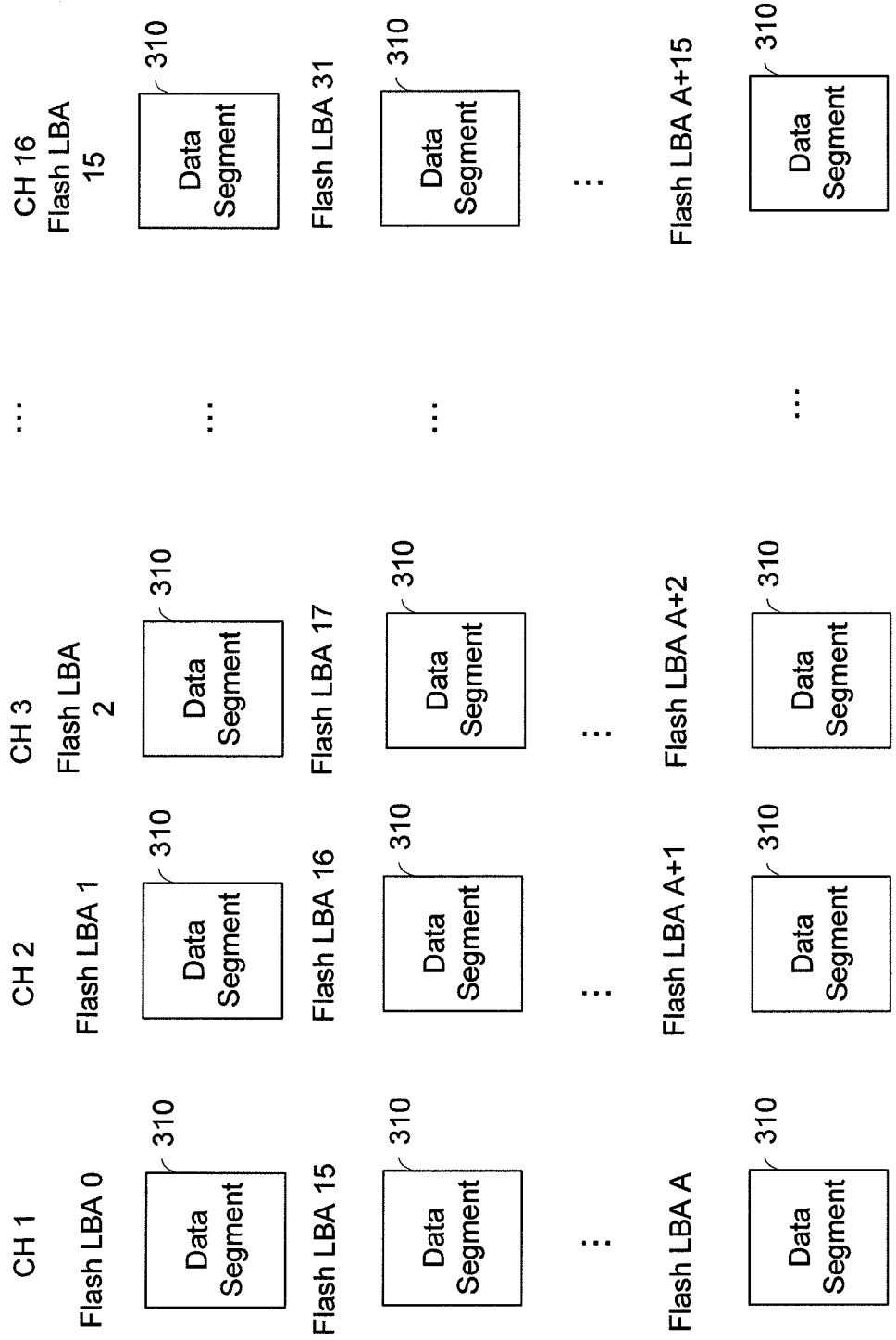
FIG. 3B illustrates a process for allocating data segment in a data cache among channels according to an aspect of the disclosure.

FIG. 3B is a diagram illustrating a process for allocating data segments 310 in the data cache of the DRAM 30 among the different channels. In the example in FIG. 3B, there are 16 channels, although it is to be understood that other numbers of channels may be used (e.g., 8 channels). For example, the number of channels may be any power of two, which allows easier implementation of the controller 20 using firmware. The data segments 310 may be data received from the host system 80 in one or more host write commands. In this example, the data segments 310 are given corresponding flash LBAs by the controller 20. As discussed above, for the example in which there are eight data sectors per data segment, each flash LBA may correspond to eight host LBAs. For example, flash LBA 0 may correspond to host LBAs 0-7, flash LBA 1 may correspond to host LBAs 8-15, and so forth.

As shown in FIG. 3B, the flash LBAs are split evenly among the 16 channels and striped across the 16 channels. In the example in FIG. 3A, flash LBA 0 is assigned to channel 1, flash LBA 1 is assigned to channel 2, flash LBA 2 is assigned to channel 3, and so on. As data is received from the host system 80 during a host write and stored in the data cache, the number of data segments 310 allocated to each channel increases. In the example in FIG. 3B, the flash LBAs are sequential across the channels. However, this does not have to be the case. For example, the flash LBAs may comprise two or more random LBAs when the host system 80 writes data randomly to the flash storage device 10 (random host LBAs) instead of sequentially to the flash storage device 10 (sequential host LBAs). In either case, the controller 20 can evenly split the corresponding flash LBAs among the N channels, for example, using the algorithm described above or other method.

When the number of data segments 310 for a channel in the data cache reaches enough to fill a data block (e.g., 32 data segments), the controller 20 writes the data segments 310 from the data cache to the corresponding flash memory 25-1 to 25-N via the corresponding channel. The controller 20 may write the data segments 310 for a channel to the corresponding flash memory 25-1 to 25-N by queuing write commands for the data segments 310 in the register (e.g., FIFO register) of the corresponding flash memory interface 28-1 to 28-N (e.g., one write command for each data segment 310). The flash memory interface 28-1 to 28-N may then send the queued write commands to the corresponding flash memory 25-1 to 25-N via the corresponding channel. For example, the flash memory interface 28-1 to 28-N may sequentially send the queued write commands to the corresponding flash memory 25-1 to 25-N via the corresponding channel. Each time a write command is sent to the corresponding flash memory 25-1 to 25-N, the flash memory interface 28-1 to 28-N may transfer the data segment for the write command from the data cache to the corresponding flash memory 25-1 to 25-N via the corresponding channel. In this example, the flash memory interface 28-1 to 28-N may send one write command to the corresponding flash memory 25-1 and 25-N and wait until it receives an indication from the flash memory 25-1 to 25-N that the data segment has been successfully written before sending the next write command in the register to the channel.

The flash memory interfaces 28-1 to 28-N may send write commands to their respective flash memories 25-1 to 25-N substantially in parallel via the respective channels. In addition, during the time a flash memory interface 28-1 to 28-N waits for the corresponding flash memory 25-1 to 25-N to complete a write command after transferring data for the write command from the data cache to the corresponding flash memory 25-1 to 250-N, other flash memory interfaces 28-1 to 28-N may transfer data for other write commands from the data cache to corresponding flash memories 25-1 to 25-N. The parallel write operations among the plurality of flash memories 25-1 to 25-N results in faster write times and maximizes the write performance of the flash array 22.

When the controller 20 receives a host read command from the host system 80 including host LBAs, the controller 20 determines the corresponding flash LBAs, as discussed above. The controller 20 then maps the flash LBAs to the corresponding physically addresses in the flash array 22 using the address table. The controller 20 then generates read commands corresponding to the physically addresses and queues the read commands in the registers of the respective flash memory interfaces 28-1 to 28-N. Each flash memory interface 28-1 to 28-N sends the corresponding read commands to the corresponding flash memory 25-1 to 25-N via the corresponding channel and writes the resulting read data to the data cache. When all of the requested data is written to the data cache in the DRAM 30, the controller 20 may transfer the requested data from the data cache to the host system 80 via the interface 15. Splitting flash LBAs evenly among the channels helps ensure that, for a host read spanning several flash LBAs, the requested data is read from a plurality of the flash memories 25-1 to 25-N.

In one aspect, the data cache in the DRAM 30 may be divided into cache blocks. Each cache block may correspond to a physical address in the DRAM 30 for storing one data segment (e.g., 4 K bytes).

In one aspect, the cache blocks are all held in a linked list. When a new cache block is required for a new data segment, the data segment in the cache block that is on the top of the linked list is removed from the data cache (assuming it is not active) and the cache block is allocated for the new data segment. The cache block with the new data segment is then placed at the end of the linked list and the new data segment is stored in a physical address of the data cache corresponding to the cache block. The new data segment may come from data in a host write command or data read from the flash array 22 in response to a host read command. If the data in the cache block is not accessed again, then the cache block will slowly move up the linked list as cache blocks are allocated for new data segments and moved to the end of the linked list.

Figure 4A:
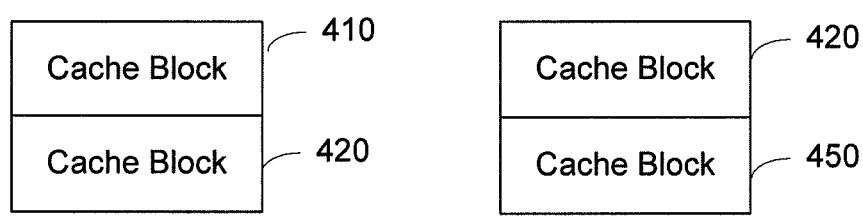
FIGS. 4A and 4B illustrate a linked list for cache blocks according to an aspect of the disclosure.
Figure 4B:
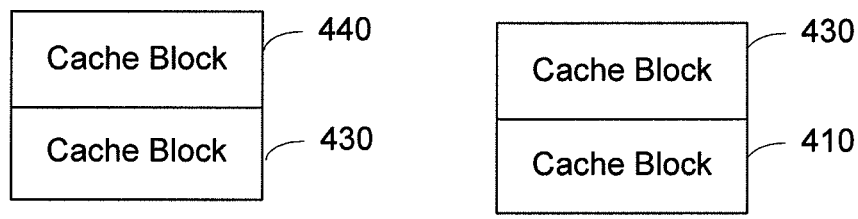

FIGS. 4A and 4B illustrate an example of a linked list 405 according to an aspect. FIG. 4A shows the linked list 405 in which cache block 410 is on the top of the linked list 405 and cache block 430 is on the end of the linked list 405. In this example, when a new data segment needs to be stored in the data cache, the controller 20 removes the data segment corresponding to cache block 410 from the data cache, allocates cache block 410 to the new data segment and moves the cache block 410 to the end of the linked list 405. FIG. 4B shows the linked list 405 after cache block 410 has been moved to the end of the linked list 405. As a result, the other cache blocks in the linked list 405 have been moved up one position in the linked list 405. For example, cache block 430 has been moved up one position from the end of the linked list 405, as shown in FIG. 4B.

In the above aspect, the controller 20 may continue to store a data segment in the data cache after the data segment has been written to the flash array 22. The controller 20 removes the data segment from the data cache when the corresponding cache block reaches the top of the linked list and the controller 20 needs to allocate the cache block for a new data segment.

If a host read command is received from the host system 80 and the data for the read command is found in the data cache, then the flash array 22 does not need to be accessed. In this case, the controller 20 may retrieve the data from the data cache and the corresponding cache block is moved from the current position on the linked list to the end of the linked list. This way frequently accessed data will be retained in the data cache because a cache block that is being frequently accessed will be continually moved to the end of the linked list and not reach to the top of the linked list from where the data in the cache block will be removed from the data cache.

Figures 5A, 5B:
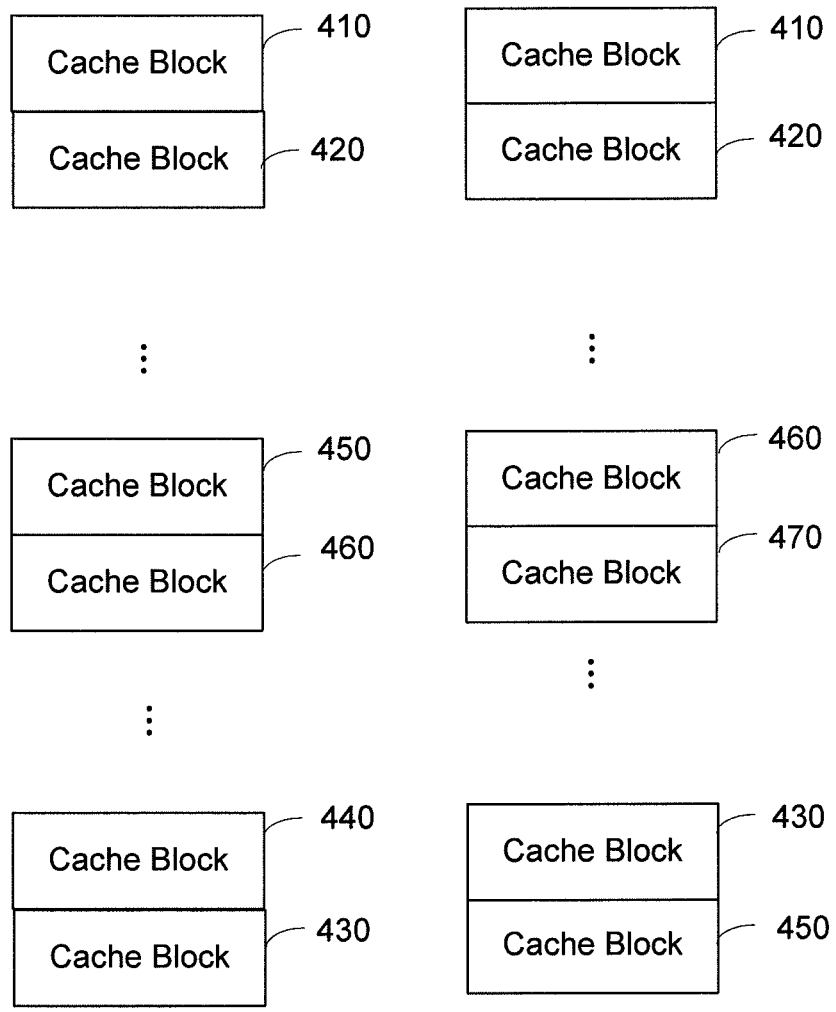
FIGS. 5A and 5B illustrate a linked list for cache blocks according to another aspect of the disclosure.

FIGS. 5A and 5B illustrate an example of the linked list 405 according to an aspect. FIG. 5A shows the linked list 405 in which cache block 410 is on the top of the linked list 405, cache block 430 is on the end of the linked list 405, and cache block 450 is at a position somewhere between cache blocks 410 and 430. In this example, when a host read command requests a data segment in the data cache corresponding to cache block 450, the controller 20 retrieves the data segment from the data cache and moves cache block 450 to the end of the linked list 405. FIG. 5B shows the linked list 405 after cache block 450 has been moved to the end of the linked list 405. As a result, the other cache blocks that where previously below cache block 450 in the linked 405 have been moved up one position. For example, cache block 430 has been moved up one position from the end of the linked list 405, as shown in FIG. 5B. If the data segment corresponding to cache block 450 is frequently read, then cache block 450 will continually move to the end of the linked list 405.

In one aspect, a cache block structure is maintained for each cache block. The cache block structure includes a physical address of the cache block in the DRAM 30 where the corresponding data segment is stored and other information (e.g., the time that the data segment was written into the data cache). The cache block structure may also include a physical address in the flash memory 22 where the corresponding data segment is stored if the data segment has already been written to the flash memory 22.

All data to be written to the flash array 22 is buffered in the DRAM 30 for a predetermined amount of time (e.g., 10 seconds) to allow the next sequential data (e.g., data sectors) in a data sequence to arrive and fill the data cache of the DRAM 30. This allows the controller 20 to write a large amount of data from the DRAM 30 to the flash array 22 at one time and free up the controller 20 to perform other operations. If the next sequential data does not arrive in the predetermined amount of time (e.g., 10 seconds), then the data in the data cache of the DRAM 30 is written to the flash array 22 and may be combined with other data that needs to be written. A complete data block may not be written to a channel of the flash memory array 22 when power is turned off and there is not a complete data block in the DRAM 30 to write to the channel. In this case, the controller 20 may write an incomplete data block to the channel of the flash array 22. Data in the DRAM 30 can also be written to the flash array 22 upon receiving a command to flush the data cache, clear the data cache, or clear the cache.

In one aspect, the controller 20 uses an address table to locate a data segment for a given flash LBA in either the flash array 22 or the data cache of the DRAM 30. The address table may also be referred to as a virtual-to-physical (V2P) table since the address table maps a logical address to a physical address.

FIG. 6 shows an example of an address table 605 according to an aspect of the disclosure. Each of the entries 610-1 to 610-n in the address table 605 corresponds to a flash LBA and may be arranged in order of the flash LBAs so that flash LBA 0 corresponds to the first entry, flash LBA 1 to the second entry, and so on. The entry 610-1 to 610-n for each flash LBA 615 may include a channel number 620, a cache indicator 625 indicating whether the corresponding data segment is in the data cache, and depending on whether the data segment is in the data cache, a physical address of the data in the flash array 22 or a cache block number 630.

If the cache indicator 625 indicates that the data segment for a flash LBA 615 is not in the data cache, then the entry includes the physical address 630 of the data segment in the flash array 22. In this case, the controller 20 uses the physical address 630 to locate the data segment in the flash array 22. The physical address 630 can be in a hardware format so that the physical address can be passed directly to the hardware side of the flash storage device 10 to retrieve the data segment from the flash array 22.

If the cache indicator 625 indicates that the data for a flash LBA 615 is in the data cache, then the entry for the flash LBA 615 includes a cache block number 630. The cache block number 630 points to the cache block corresponding to the flash LBA. This allows the controller 20 to retrieve the cache structure of the corresponding cache block. The cache structure in turn provides the controller 20 with the physical address where the data is located in the DRAM 30 and the NAND device information if required plus other useful information (e.g., the time that the corresponding data segment was written into the data cache). The NAND device information may include a physical address of the corresponding data segment in the flash array 22.

In one aspect, the controller 20 updates the address table 605 when data sectors corresponding to a data segment are received from the host system 80 in a host write command or read from the flash array 22 in response to a host read command. The controller 20 allocates a cache block from the top of the linked list for the corresponding data segment. The controller 20 then creates an entry in the address table 605 for the data segment including the flash LBA 615 of the data segment and a cache block number 630 of the cache block allocated to the data segment. The controller 20 also sets the cache indicator 625 to indicate that the data segment is located in the data cache. If the data segment is eventually written to the flash array 22, then the controller 20 may include the physically address of the data segment in the flash array 22 in the corresponding cache block. When the data segment is removed from the data cache, then the controller 20 may update the entry for the data segment accordingly. The controller 20 may set the cache indicator 625 to indicate that the data segment is not stored in the data cache and include the physical address of the data segment in the flash array 22. The controller 20 may retrieve the physical address from the cache structure in the cache block.

In one aspect, each data block in the flash array 22 can hold random data segments instead of consecutive data segments. Thus, when random write data is received for a flash LBA (e.g., in a random host write command), it is not necessary for the controller 20 to re-write a complete data block for the corresponding data segment. For example, when the controller 20 receives write data (updated data) for a flash LBA corresponding to a data segment in a data block (old data block) in the flash array 22, the controller 20 writes the write data (updated data) to another data block (new data block) in the flash array 22 instead of re-writing the old data block with the write data (updated data) for the flash LBA. In this case, the data segment corresponding to the flash LBA in the old data block is invalid since the write data (updated data) for the flash LBA is stored in the new data block. This reduces wear on the old data block because the old data block does not have to be erased and rewritten when one of its data segments is subsequently updated by the host system 80. Thus, a data block can hold a varying number of valid data segments at a given time, depending on how many data segments in the data block are updated and written to other data blocks.

In one aspect, the controller 20 maintains a table for each data block in the flash array 22. The table for each data block identifies the number of valid data segments in the data block and the flash LBAs corresponding to valid data segments held in the data block. In an aspect, the controller 20 uses this information to identify data blocks with the fewest valid data segments. After identifying the data blocks with the fewest valid data segments, the controller 20 copies the valid data segments of the identified data blocks to one or more other data blocks in the flash array 22, and erases the identified data blocks to provide pre-erased data blocks for more write data. This allows the maximum number of data blocks to be freed up for write data while having to copy the least amount of data to other data blocks. As a result, fewer write operations are required to free up data blocks, providing more bandwidth for host read and write data.

In one aspect, each data block is kept in one of a plurality of linked lists depending on the number of valid data segments in the data block. All data blocks with only one valid data segment each are kept in one list, all data blocks with only two valid data segments are kept in another list, and so on. As discussed further below, the controller 20 performs dynamic wear leveling (to free up data blocks) using the lists of valid data segments to identify data blocks having only one valid data segment, data blocks having only two valid data segments, and so on. There are also separate lists for bad (e.g., defective) data blocks, empty data blocks, free data blocks and data blocks (e.g., data blocks being written to), etc. Each data blocks is also kept in one of a plurality of linked lists depending on the number of erase cycles performed on the data block. As discussed further below, the controller 20 performs static wear leveling using the linked lists of erase cycles.

In one aspect, the controller 20 places a time stamp on each data segment that is written into the flash array 22 allowing the controller 20 to know which data segments are newer than the old ones. The time stamps may be generated by incrementing a counter when a write operation is performed and using the current count value of the counter for the time stamp for data being written during the write operation. For example, the time stamp for a write may be 11000, then 11001 for the next write, and so on. Thus, the time stamps allow the controller 20 to determine the order in which data segments were written into the flash array 22 by comparing their time stamps. In this example, a data segment with a time stamp having a higher count value is newer than a data segment with a time stamp having a lower count value. The time stamp for a data segment may be stored with the data segment in the flash array 20 and/or stored in a table.

In an aspect, the controller 20 compares the time stamps of data segments in the background and not during regular read/write operations. When two data segments in different data blocks correspond to the same flash LBA, then the older data segment (as indicated by the corresponding time stamp) is invalid. Eventually, a data block with many invalid data segments is erased and one or more valid data segments that were in the data block are combined with other incoming data or valid data from other blocks that are being erased. The combined data is written to a new data block, freeing up the erased block for write operations. When the one or more valid data segments are written to the new data block, the address table is updated with the new physical addresses of the valid data segments. In an aspect, the above operations are performed in the background to make pre-erased blocks available for write operations. Since this is a background operation, the flash storage device 10 may need to allocate more flash memory than is logically addressable by the controller 20. For example, a flash storage device 10 with 256 GB of memory may only have 146 GB of addressable memory (e.g., addressable to the host system 80). This helps provide pre-erased blocks to write to most of the time.

Preferably, the time stamps are used if reconstruction of the address table is required. When there are two or more physical addresses for the same flash LBA, the time stamps of the corresponding data segments may be used to determine which data segment is the most recent (e.g., data segment with the time stamp having the highest count value is the most recent). In this example, the physical address with the more recent time stamp is used to reconstruct the address table entry for the flash LBA.

Figure 7:
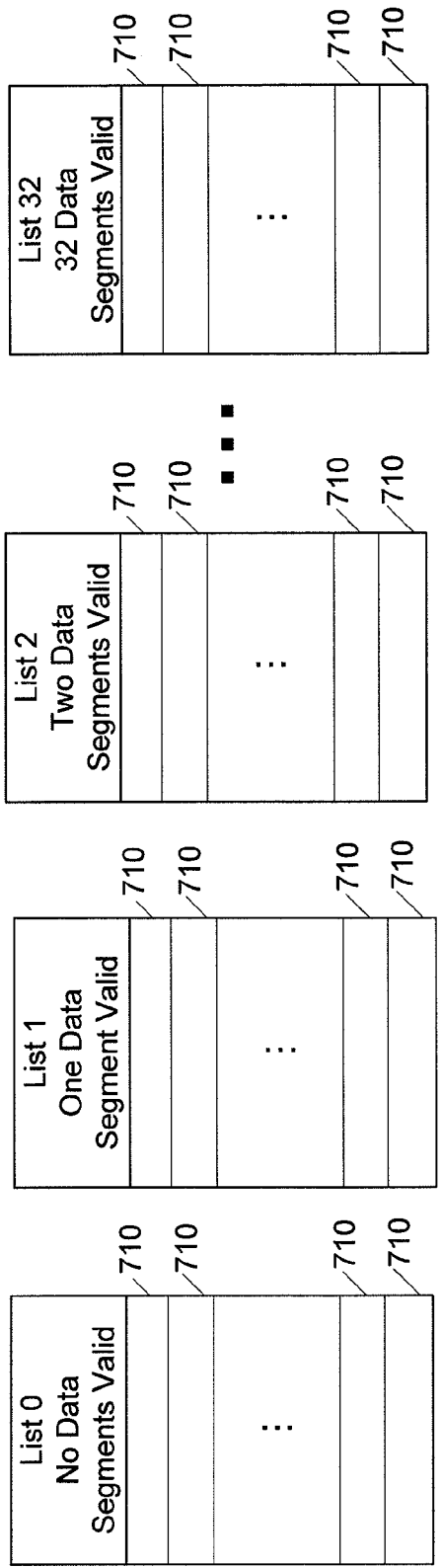
FIG. 7 illustrates an example of linked lists for keeping track of valid data segments in data blocks according to an aspect of the disclosure.

FIG. 7 illustrates linked lists that are used to determine which data block 710 to remove data from and erase to provide pre-erased blocks for high-speed writing according to one aspect. As an example, each data block 710 may be 128 K bytes in size and hold 32 4 K bytes data segments. Normally, a data block 710 will be full when it is first written to and will therefore have 32 valid data segments in this example. The linked lists may cover data blocks in the entire flash array 22. Alternatively, the linked lists may be implemented for each channel of the flash array 22.

The link lists are used to keep track of the number of valid data segments in each data block 710. In one aspect, each data block 710 is in one of the linked lists of valid data segments. In the example above, there are 33 linked lists since each data block has zero to 32 valid data blocks. List 0 comprises data blocks 710 with no data segment holding valid data. List 1 comprises data blocks 710 with only one data segment holding valid data, list 2 comprises data blocks 710 with two data segments holding valid data, and so forth. List 32 comprises data blocks 710 with all 32 data segments holding valid data. The number of linked lists may be different from 32 depending on the sizes of the data segments and/or data blocks. For example, the number of linked lists may be lower if larger data segments are used (fewer data segments in each data block 710). As another example, the number of linked lists may be larger if larger data blocks 710 are used (more data segments per data block). The flash storage device 10 may include lists of pre-erased data blocks 710, bad data blocks 710, system blocks, etc. The data blocks 710 in the lists may be identified by addresses of or pointers to the data blocks 710 therein or other means.

By way of example, when a data block XX is initially written to, the data block XX will be full and therefore go to the list with all valid data segments (list 32 in the example illustrated in FIG. 7). If one of the data segments in data block XX is subsequently written again, then the data segment will go into a different data block YY. For example, if the flash storage device 10 receives a host write command from the host system 80 that results in a write to flash LBA 12100 and a data segment for flash LBA 12100 is already stored in data block XX, then the controller 20 writes the data in the write command for flash LBA 12100 to data block YY. Thus, the data segment for flash LBA 12100 is rewritten to data block YY, invalidating the data segment for flash LBA 12100 in data block XX. As a result, the data block XX will have only 31 valid data segments, and the controller 20 will move the data block XX from list 32 to list 31 in the example illustrated in FIG. 7. Also, the address table for flash LBA 12100 is updated with the physical address of the data segment in data block YY. Each time another data segment in data block XX becomes invalid, data block XX is moved down to the appropriate list.

Pre-erased blocks that are available for write operations are identified in a pre-erased list. When the number of pre-erased data blocks in the pre-erased list gets low (e.g., below a predetermined threshold), the controller 20 may need to erase some of the data blocks 710 to increase the number of pre-erased data blocks available for write operations. In one aspect, the controller 20 determines which data blocks 710 to erase by looking in the lists of valid data segments in ascending order. The controller 20 first looks in list 0 for data blocks 710 holding no valid data. Since data blocks in list 0 require no movement of data to erase, these data blocks 710 are erased and placed into the pre-erased list first. If list 0 is empty and/or additional pre-erased blocks are needed, then the controller looks in list 1 for data blocks 710 with only one valid data segment. Each data block 710 in list 1 only require the movement of one data segment to be erased. If list 1 is empty and/or additional pre-erased blocks are needed, then the controller looks in list 2, and so forth. As data blocks 710 are erased, they are added to the end of the pre-erased list. When a pre-erased block is needed, it is taken from the top of the pre-erased list. This provides a form of dynamic wear leveling. The earlier pre-erased blocks are on the top of the list.

When multiple data blocks 710 with one valid data segment are erased to produce pre-erased blocks, the valid data segments of these erased data blocks 710 may be combined and rewritten into a new single data block. For example, if there are 32 data blocks 710 with one valid segment each, then the 32 valid data segments of these data blocks 710 may be written into a new block 710, and all 32 data blocks 710 can be erased or moved to list 0. The new block 710 will have all valid data segments. The physical addresses of the 32 valid segments are updated in the address table accordingly.

Figure 8:
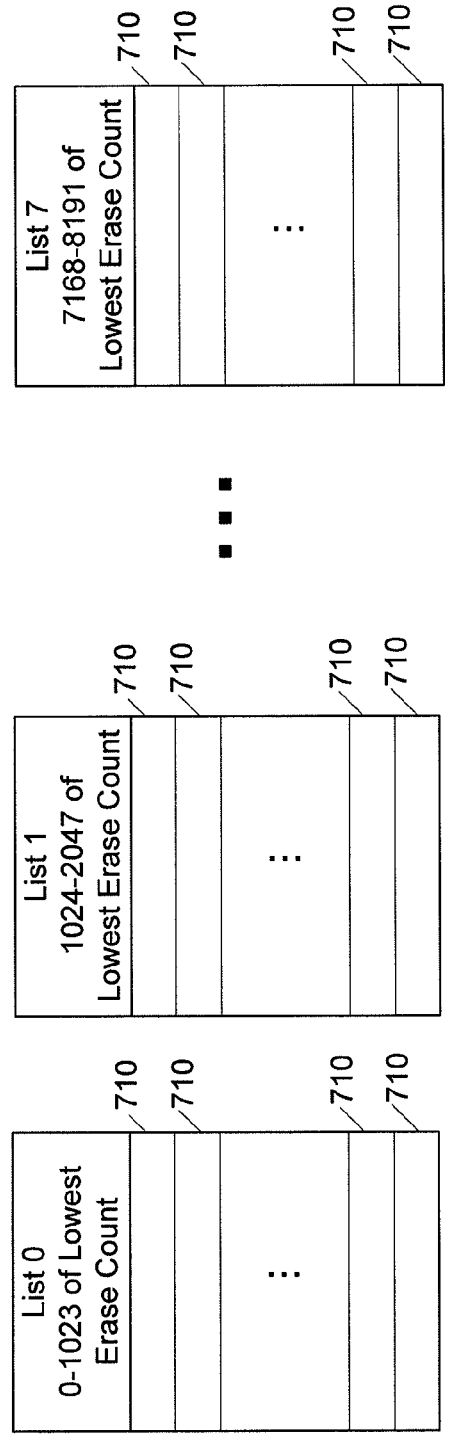
FIG. 8 illustrates an example of linked lists for keeping track of erase counts of data blocks according to an aspect of the disclosure.

FIG. 8 illustrates linked lists that are used to provide static wear leveling according to one aspect. The lists keep track of the erase counts of the data blocks 710. The controller 20 uses the lists to provide wear leveling by keeping the erase counts of the data blocks 710 within a certain range (e.g., 8192 erase counts) of each other. In addition to belonging to one of the lists of valid data segments discussed above, the data blocks 710 (with the exception of BAD or System data blocks) are in one of a plurality of static wear lists. The example in FIG. 8 has eight static wear lists. Each list comprises data blocks 710 that are within a certain range of the lowest erase count. The linked lists may cover data blocks in the entire flash array 22. Alternatively, the linked lists may be implemented for each channel of the flash array 22.

In the example illustrated in FIG. 8, list 0 comprises data blocks 710 with erase counts that are within 1023 of the lowest count. List 1 comprises data blocks 710 with erase counts that are within a range of 1024-2047 of the lowest count, and so forth up to list 7, which comprises data blocks 710 with erase counts that are within a range of 7168-8191 of the lowest count. Although the example in FIG. 8 has eight lists, any number of lists may be used with any count range.

Each time a data block 710 is erased, it is moved to the end of the list it is in. In practice, this means that each list tends to be in roughly an ascending numerical sequence. This may be especially true at the start of the list where data blocks with the lowest counts are located.

When a data block 710 reaches list 7 (highest list), the block is deemed as hot and in need of static wear leveling. The data block 710 in list 7 will have been pre-erased at this point (since the count of a data block is not bumped up until the data block is erased). Data is copied from the data block at the head of list 0 (which should hold static data because of its low erase count) to the pre-erased data block 710 with the high erase count in list 7. The low count data block 710 from which the data was moved is erased and put into the free pool. When list 0 becomes empty, the lists are all moved down by one (which involves moving head and tail pointers) and the lowest count is bumped up by 1024. In this example, the data blocks 710 in list 1 are moved down to list 0, the data blocks 710 in list 2 are moved down to list 1, and so forth. After the bump up, the lowest count is 1024 higher and list 7 is emptied since the data blocks previously in list 7 have been moved down to list 6.

The controller 20 may use both the lists of valid data segments and the lists of erase counts to determine which data segments need to be moved and which data blocks 710 need to be erased.

The lists described above may be stored in the DRAM 30 for fast access by the controller 20 during operation of the flash storage device 10, and stored in the flash array 22 when the flash storage device 10 is turned off.

Figure 9:
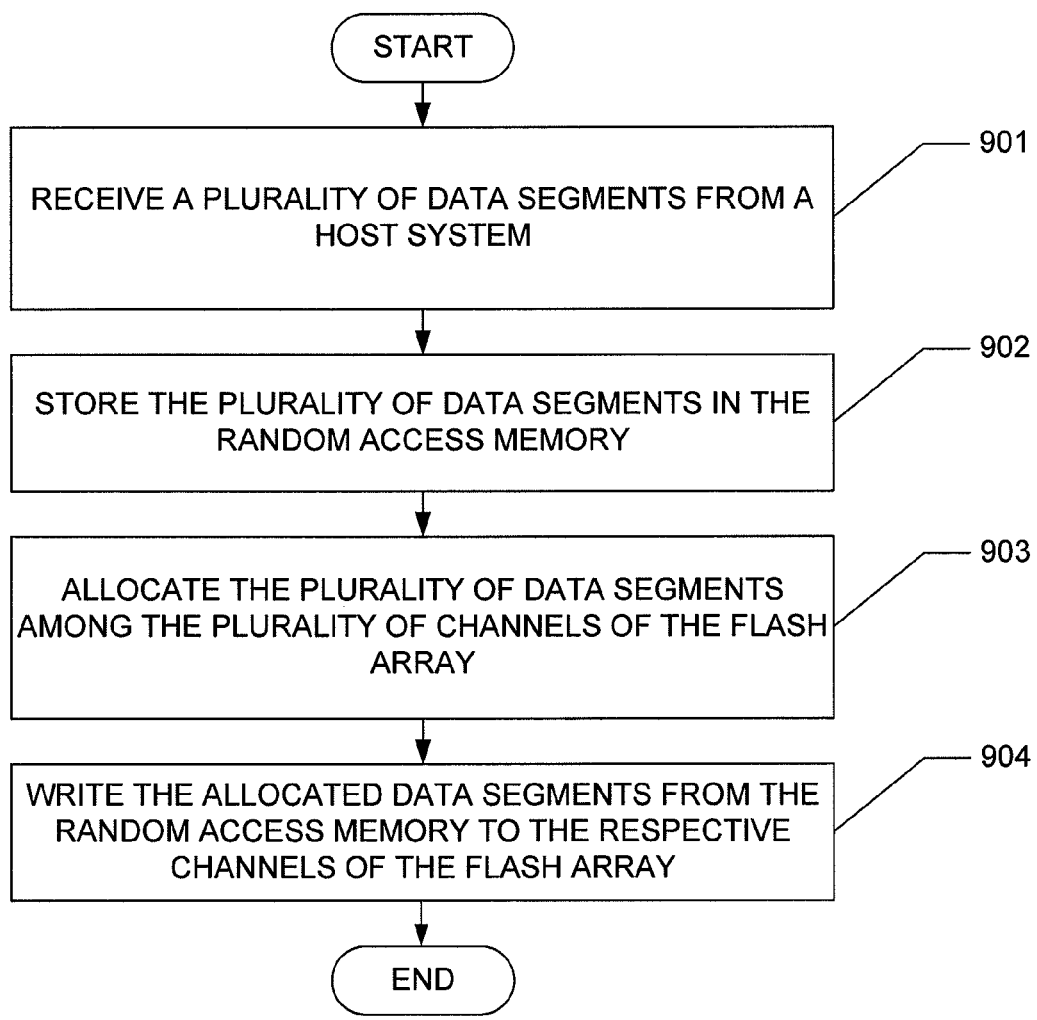
FIG. 9 is a flow chart illustrating a method of transferring data in a flash storage device according to an aspect of the disclosure.

FIG. 9 is a flow chart illustrating a method of transferring data in a flash storage device comprising a random access memory and a plurality of channels of a flash array according to an aspect of the disclosure. The method begins with step 901, in which the flash storage device receives a plurality of data segments from a host system. Each data segment may comprise data sectors. In step 902, the plurality of data segments are stored in the random access memory (e.g., DRAM 30). In step 903, the plurality of data segments are allocated among the plurality of channels of the flash array. In step 904, the allocated data segments are written from the random access memory to the respective channels of the flash array.

While the disclosure has been particularly described with reference to the various figures and aspects, it should be understood that these are for illustration purposes only and should not be taken as limiting the scope of the invention. There may be many other ways to implement the invention. Many changes and modifications may be made to the invention, by one having ordinary skill in the art, without departing

What is claimed is:

1. A method of storing data in a flash storage device, the method comprising:
   receiving a plurality of data sectors from a host system, wherein each of the data sectors is associated with a host logical address;
   storing a plurality of data segments in the random access memory, wherein each data segment comprises one of the plurality of data sectors from the host system;
   mapping the host logical address of each of the plurality of data sectors to a flash logical address of a corresponding data segment, wherein the mapping to the flash logical address is based on the respective host logical address;
   calculating a channel assignment for each of the plurality of data segments based on the flash logical address of the respective data segment;
   allocating the plurality of data segments among a plurality of channels of a flash array based on the channel assignment for each of the plurality of data segments;
   generating a plurality of write commands for the plurality of allocated data segments;
   providing each of the plurality of write commands to a respective queue associated with a channel to which the write command is allocated; and
   for each queue storing write commands, sequentially sending the queued write commands to one or more flash memories via the channel to which the write commands are allocated, and sequentially providing a respective data segment in connection with sending each queued write command from the random access memory via the memory channel corresponding to the queue.

2. The method of claim 1, wherein the data segments allocated to a respective one of the channels of the flash array are written sequentially to the respective one of the channels of the flash array.

3. The method of claim 1, wherein the allocated data segments are written to the respective channels of the flash array in parallel.

4. The method of claim 1, wherein the allocated data segments are written from the random access memory to the respective channels of the flash array at a predetermined time interval.

5. The method of claim 1, wherein the allocated data segments are written from the random access memory to the respective channels of the flash array after a predetermined number of data segments have been received and allocated to at least one of the plurality of channels of the flash array.

6. The method of claim 5, wherein the predetermined number of data segments comprises one block of data.

7. The method of claim 1, wherein each of the plurality of data segments comprises more than one of the plurality of data sectors.

8. A flash storage device comprising:
   a random access memory;
   a flash array comprising a plurality of flash memories and a respective plurality of channels; and
   a controller configured to:
      receive a plurality of data sectors from a host system, wherein each of the data sectors is associated with a host logical address;
      store a plurality of data segments in the random access memory, wherein each data segment comprises one of the plurality of data sectors from the host system;
      map the host logical address of each of the plurality of data sectors to a flash logical address of a corresponding data segment, wherein the mapping to the flash logical address is based on the respective host logical address;
      calculate a channel assignment for each of the plurality of data segments based on the flash logical address of the respective data segment;
      allocate the plurality of data segments among the plurality of channels of the flash array based on the channel assignment for each of the plurality of data segments;
      generate a plurality of write commands for the plurality of allocated data segments;
      provide each of the plurality of write commands to a respective queue associated with a channel to which the write command is allocated; and
      for each queue storing write commands, sequentially send the queued write commands to one or more flash memories via respective channels to which the write commands are allocated, and provide a respective data segment in connection with sending each queued write command from the random access memory via the memory channel corresponding to the queue.

9. The flash storage device of claim 8, wherein the controller is configured to sequentially write data segments allocated to a respective one of the channels of the flash array to the respective one of the channels of the flash array.

10. The flash storage device of claim 8, wherein the controller is configured to write the allocated data segments to the respective channels of the flash array in parallel.

11. The flash storage device of claim 8, wherein the controller is configured to write the allocated data segments from the random access memory to the respective channels of the flash array at a predetermined time interval.

12. The flash storage device of claim 8, wherein the controller is configured to write the allocated data segments from the random access memory to the respective channels of the flash array after a predetermined number of data segments have been received and allocated to at least one of the plurality of channels of the flash array.

13. The flash storage device of claim 12, wherein the predetermined number of data segments comprises one block of data.

14. The flash storage device of claim 8, wherein each of the plurality of data segments comprises more than one of the plurality of data sectors.

* * * * *